United States Patent
Altuzarra et al.

(10) Patent No.: US 12,436,315 B2
(45) Date of Patent: Oct. 7, 2025

(54) PLASMONIC METASURFACE LIGHT FILTER AND IMAGING SENSOR INCLUDING LIGHT FILTER

(71) Applicant: Metahelios Ltd, Glasgow (GB)

(72) Inventors: Charles Michael Xavier Altuzarra, Glasgow (GB); Yash Diptesh Shah, Glasgow (GB)

(73) Assignee: METAHELIOS LTD, Glasgow (GB)

( * ) Notice: Subject to any disclaimer, the term of this patent is extended or adjusted under 35 U.S.C. 154(b) by 626 days.

(21) Appl. No.: 17/936,095

(22) Filed: Sep. 28, 2022

(65) Prior Publication Data

US 2023/0280498 A1    Sep. 7, 2023

(30) Foreign Application Priority Data

Mar. 1, 2022 (GB) .................................... 2202821

(51) Int. Cl.
*G02B 5/20* (2006.01)
*G02B 1/00* (2006.01)
*G02B 5/00* (2006.01)

(52) U.S. Cl.
CPC .............. *G02B 1/002* (2013.01); *G02B 5/008* (2013.01)

(58) Field of Classification Search
CPC ...... G02B 1/002; G02B 5/008; G02B 5/1809; G02B 5/201; G02B 5/204; G02B 5/208; G02B 5/3058; G02B 5/30; G02B 2207/101; G02B 1/00; G02B 5/00; G02B 5/20

See application file for complete search history.

(56) References Cited

U.S. PATENT DOCUMENTS

| | | | | |
|---|---|---|---|---|
| 2014/0029104 A1* | 1/2014 | Guo | ...................... | G02B 5/008 359/585 |
| 2016/0107471 A1* | 4/2016 | Landrock | ............ | H01J 37/3174 359/569 |
| 2017/0322457 A1* | 11/2017 | Chanda | ................... | G02F 1/195 |

OTHER PUBLICATIONS

Shah et al., "Simultaneous multi-spectral, single-photon fluorescence imaging using a plasmonic colour filter array", Journal of Biophotonics, Mar. 30, 2021.
Shah et al., Ultralow-light-level color image reconstruction using highefficiency plasmonic metasurface mosaic filters, Optica, Jun. 3, 2020, pp. 632-639.
Search Report for corresponding GB Application No. GB220282.1 dated Aug. 17, 2022.
Notification of Reason for Refusal for corresponding KR Application No. 10-2024-7032494 dated Apr. 2, 2025 (7 pages).
Petronijevic, E., et al., "Chiral effects in low-cost plasmonic arrays of elliptic nanoholes", Optical and Quantum Electronics, Mar. 2020 (10 pages).
International Search Report for corresponding PCT Application No. PCT/GB2023/050466 dated Jun. 28, 2023 (16 pages).

(Continued)

*Primary Examiner* — Balram T Parbadia
(74) *Attorney, Agent, or Firm* — Leason Ellis LLP

(57) ABSTRACT

A plasmonic metasurface light filter is disclosed. The light filter comprises a planar array of unit cells. Each unit cell includes a plurality of light-transmissive nanoholes having a non-circular substantially elliptical cross-section. Each unit cell is individually tunable with respect to frequency and polarization of light to filter by varying geometry of its respective nanoholes.

19 Claims, 5 Drawing Sheets

(56) References Cited

OTHER PUBLICATIONS

Carlota Ruiz De Galarreta et al., "Single-step fabrication of high performance extraordinary transmission plasmonic metasurfaces employing ultrafast lasers", arxiv.org Cornell University Library, Sep. 2021 (10 pages).

Shah et al., Ultra-narrow Line Width Polarization-Insensitive Filter Using a Symmetry-Breaking Selective Plasmonic Metasurface, ACS Photonics, Dec. 2017, pp. 663-669.

Shah et al., "Supporting Information: Ultra-narrow linewidth polarization-insensitive filter using a symmetry-breaking selective plasmonic metasurface", Microsystems Technology group, Electronics and Naoscale engineering, Department of Engineering, University of Glasgow, Glasgow, UK, retrieved from the internet <<https://pubs.acs.org/doi/suppl/10.1021/acsphotonics.7b01011/suppl_file/ph7b01011_si_003.pdf>>, Jun. 20, 2023 (5 pages).

\* cited by examiner (A) (B)

PLASMONIC METASURFACE LIGHT FILTER AND IMAGING SENSOR INCLUDING LIGHT FILTER

CROSS-REFERENCE TO RELATED APPLICATIONS

This application claims priority to GB Patent Application No. 2202821.1 filed Mar. 1, 2022, the contents of which are hereby incorporated by reference in its entirety as if set forth herein.

FIELD OF THE DISCLOSURE

The present disclosure relates to a plasmonic metasurface light filter that is particularly suitable for use with imaging sensors

BACKGROUND TO THE DISCLOSURE

Single photon imagers have gained prominence in the field of depth profile or three-dimensional imaging, astrophysics, fluorescence imaging due to their capability of low photon imaging and high acquisition rate imaging. Architecturally these imaging sensors are only able to detect the intensity of the light. However, this is just a fraction of the information that is in the light field scattered from the object being imaged. Valuable information on an object can be obtained from wavelength, polarization, phase, and temporal characteristics of light. It is standard for achieving color acquisition with cameras to use dichroic films and dye filters in a Bayer pattern. For polarization, wire grid polarisers have been developed that are sensitive to one polarization of light. For full polarization imaging analysis various polarization directions are needed and a combination of moving plates is required to change the polarization. These moving plates are always broadband, thus not wavelength specific. More importantly bulk polarisers make it impossible to measure more than one polarization state at a time.

In the last few years though, there has been a growing interest in using metamaterials and their two-dimensional equivalent-metasurfaces for light manipulation, both for single photon imagers and more traditional CMOS and similar type image sensors.

Metasurfaces are subwavelength nanostructures. Plasmonic metasurfaces exploit free electron oscillations at the interface between a material of negative permittivity, $-\varepsilon$ (for example a metal layer) and a material of positive permittivity, $+\varepsilon$ (for example a glass substrate). The metallic layer is deposited and engineered with nanostructures so as to provide a planar mechanism to modulate the incident light. However, while there are many attractive reasons to try plasmonic metasurfaces, they have a significant disadvantage—efficiency of current plasmonic metasurfaces at visible and near-infrared frequencies can be $\leq 1.0\%$.

STATEMENT OF THE DISCLOSURE

According to an aspect of the present disclosure, there is provided a plasmonic metasurface light filter comprising planar array of unit cells, each unit cell including a plurality of light-transmissive nanoholes having a substantially elliptical cross-section, each unit cell being individually tunable with respect to frequency and polarization of light to filter by varying geometry of its respective nanoholes.

Preferably, the tuning of the unit cell is optimized with regard to extinction ratio.

Preferably, each nanohole in a unit cell has its elliptical major and minor axes oriented in parallel to the elliptical long axis of the other nanoholes in the unit cell and selected in dependence on the polarization of light to be filtered by the respective unit cell.

The size of nanoholes of the unit cells is preferably selected in dependence on the light wavelength to be filtered by the respective unit cell.

Preferably, the array corresponds in size to an imaging sensor, each of the unit cells being positioned to align with a pixel of the imaging sensor when the array is placed over the imaging sensor.

The metasurface may comprise an aluminium layer having the nanoholes etched therein. The metasurface may comprise an annealed gold film having the nanoholes etched therein.

The metasurface may be capped.

Embodiments of the present disclosure relate to a plasmonic metasurface and in particular to a 2D array of plasmonic metasurface unit cells in which individual unit cells in the array have geometrical properties that are selected in dependence on wavelength and(/or) polarization of light to be filtered by that array element.

In preferred embodiments, a single layer of nanostructures etched into a thin metallic film (nm thick) can filter a particular wavelength (color) and polarization simultaneously to form a spectropolarimeter for single photon avalanche diode (SPAD) and CMOS cameras. Due to implementation as an array, embodiments can be used in a pixelated imaging sensor format which can be scaled from blue (450 nm) to SWIR (1-2 µm). Thus, per pixel not only can a higher transmission of a designed color be observed but embodiments can incorporate selected polarisation per pixel with an efficient extinction ratio to differentiate from orthogonal polarisations for nanostructure devices.

In preferred embodiments, the geometry and arrangement of elliptical nanoholes in a thin metal film provide the simultaneous dual functionality of any color and polarisation selectivity without the use of any bulky optics of moving parts. The interplay between various optical phenomena results in higher transmission and polarization identification.

Preferred embodiments can be used for optimised spectropolarization filters such as filters for multispectral color with polarization. Embodiments can be achieved on a single platform of nanostructured metallic layer of nm thickness by exploiting optical phenomena through light matter interaction.

Metasurfaces in embodiments of the present disclosure are judicially positioned with respect to an imaging sensor's pixels so that when positioned over the imager and aligned with its pixels the filter controls individually and simultaneously the amplitude, color, and polarization of light being filtered color. No other optic is known to be able to provide this versatility in manipulation of light fields.

The advantages of plasmonic metasurfaces of embodiments of the present disclosure are that they require only a single lithographic step to filter any wavelength while being significantly thinner and easier to fabricate as compared to competing technologies such as dichroic films or polymer dye filters. In the case of dichroic filters, multiple films of selective refractive index are required with the layer thickness dependent on the wavelength of light selected for filtering. Thus, for example to design an array of filters each filtering a different wavelength of light, multiple lithographic steps are required with an additional coating to block infra-red light. Neither dye filters nor dichroic films are able to provide polarization selectivity. To achieve spectro-polarimetry not only color and polarization selectivity is essential but also sufficient out-of-band rejection with other colors and polarizations to provide better color contrast and polarization extinction ratio. Embodiments of the present disclosure seek to address this need.

At present, there is an engineering obstacle to realising a compact spectro-polarimetric imaging system. Current optical setups are too bulky using centimeter-thick conventional optics. However, metasurfaces according to embodiments of the present disclosure seek to overcome these obstacles and to provide significant degrees of freedom in comparison to current approaches. Advantageously, metasurfaces can be integrated directly onto a CMOS camera pixel, single photon camera pixels and SPAD arrays. There is no need for a complex engineering undertaking of stacking various metasurfaces—rather, metasurfaces according to embodiments of the present disclosure enable the incorporation of different functionalities on one platform (array) by using unit cells and selectively varying geometrical properties of elliptical nanoholes in each unit cell within the array. Thus, embodiments seek to open up the potential for multispectral imaging and polarimetry without significant engineering or cost consequences.

The ability to simultaneously sense polarization and wavelength of light on a single metasurface layer, together with their compactness and compatibility with conventional nanofabrication processes, render metasurfaces as versatile candidates for miniaturization of readily integrated optical devices for many applications such as but not limited to spectropolarimeters, earth observation, target identification (defense), bio-sensing, oceanography, research in academia and industry as well as commercial applications such as polarimetry for facial recognition on mobile devices.

Preferred embodiments enable creation of filters from one unit cell design of a plasmonic metasurface on a single layer that can be scaled from 450 nm to 2 µm (blue to SWIR regime). This design requires a single lithographic step which makes it easy to manufacture into a pixelated format that can be directly integrated onto a camera chip. It is ultra-thin and has no moving parts. The design also has high out-of-band rejection ratio for color selectivity and appreciable extinction ratio for orthogonal polarization states.

In the described embodiments, a unit cell refers to a common lattice arrangement of 8 nanoholes. The dimensions, orientation and relative distances between the nanoholes may vary depending on frequency and polarization to be filtered. There may be variation in size of the unit cells, although typically this is low. For example, if the pixel size is 10 µm, in order to be covered it might need 21 repetitions of a blue unit cell, 16 repetitions of a green unit cell, or 14 repetitions of a red unit cell. This is taken into account during design of the metasurface for the specific sensor.

The dual functionality of frequency and polarization filtering provided by the presently claimed invention is not something that can be straightforwardly achieved. For example, higher electrical field confinement and therefore higher transmission can be achieved by designs that are completely polarization insensitive. However, taking into account polarization while also maintaining good transmissivity is not straightforward. The inventors of the present application have identified that a unit cell design, and preferably a unit cell design using solely elliptical nanoholes that seeks to address this. Unit cells having nanohole sizing and geometry described (or calculated using the principles set out) in embodiments below are understood to be particularly optimized in this regard.

BRIEF DESCRIPTION OF THE DRAWINGS

Embodiments of the present disclosure will now be described by way of example only, with reference to the accompanying drawings, in which.

DETAILED DESCRIPTION

In certain embodiments of the present disclosure, a single lithography layer plasmonic metasurface light filter is produced. The metasurface of preferred embodiments has a low level of fabrication complexity and enables the manipulation of transmitted light for simultaneous wavelength selection and polarization control. The metasurface design in preferred embodiments includes elliptical nanoholes etched into a nanometer thick metal layer.

Figure 1A:
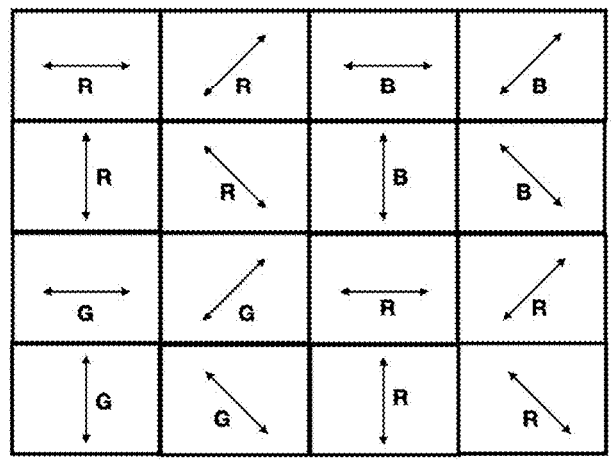
FIG. 1A is a schematic diagram of a plasmonic metasurface light filter according to an embodiment.

As shown in FIG. 1A, a plan view of a plasmonic metasurface light filter 10 according to an embodiment of the present disclosure is shown. The metasurface 10 includes a planar array of unit cells 20 (in this example the planar array is n×m unit cells). Each unit cell 20 includes a plurality of light-transmissive nanoholes (discussed in more detail below) having a non-circular substantially elliptical cross-section. Each unit cell is individually tunable with respect to frequency and polarization of light to filter by varying geometry of its respective nanoholes. In the example shown in FIG. 1A, there are unit cells for Red (R), Green (G) and Blue (B) wavelength filtering as well as differing polarizations of light for those respective wavelengths. The arrows in the illustration show polarization angle being filtered—0° (arrows top to bottom of cell), 90° (arrows left to right of cell), 45° (arrows bottom left to top right of cell) and 135° (arrows bottom right to top left of cell).

Figure 1B:
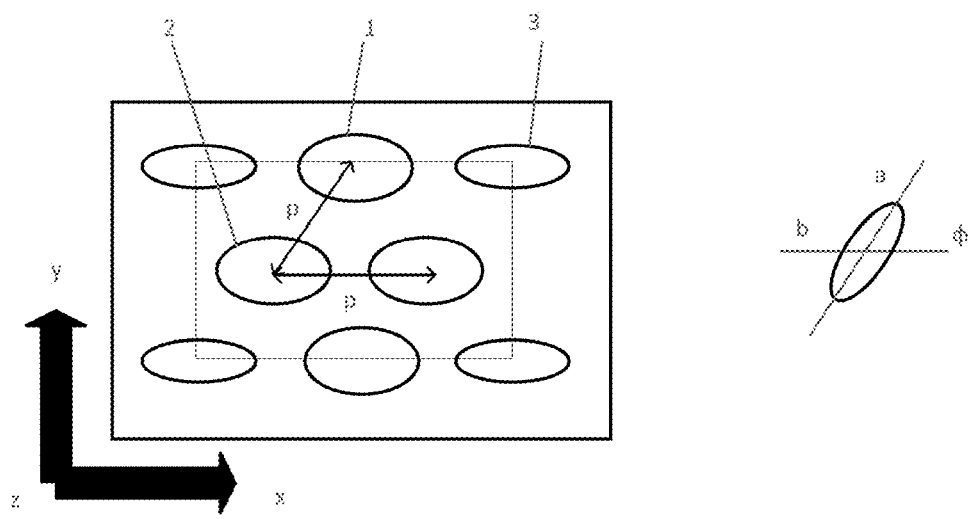
FIG. 1B is a schematic plan view of a unit cell according to an embodiment.

FIG. 1B, a plan view of a unit cell 20 according to an embodiment of the present disclosure is shown. The unit cell includes elliptical nanoholes 30 having geometry that is varied at time of manufacture in dependence on the function of the particular unit cell so as to tune the filtering of the unit cell.

Figure 1C:
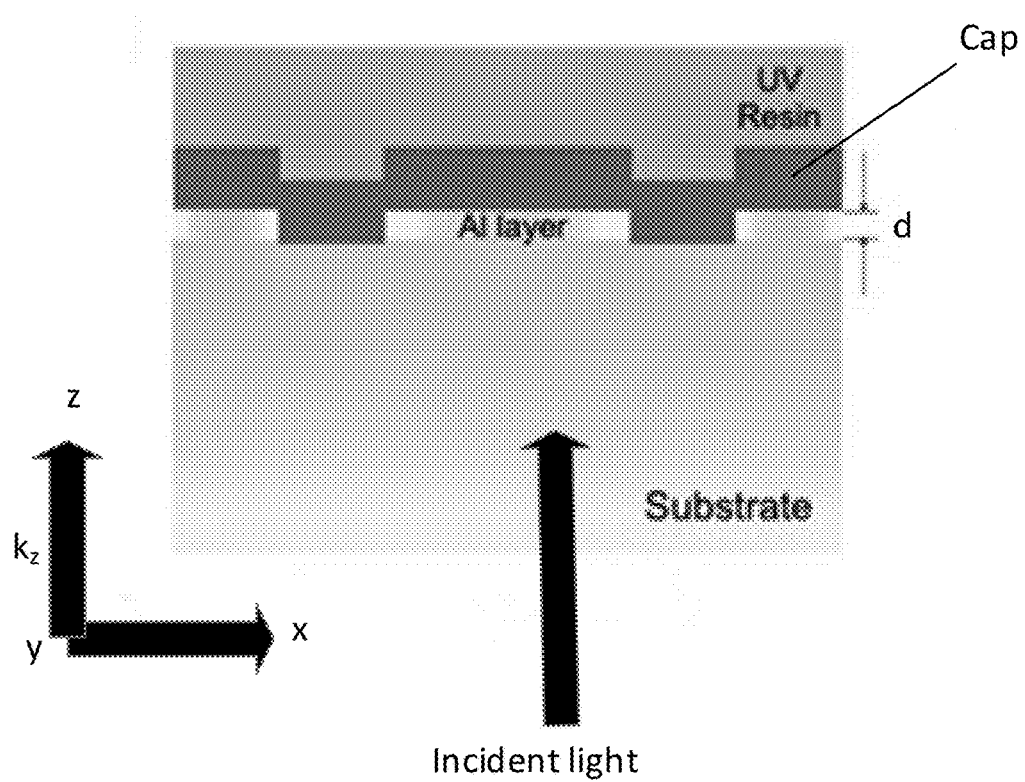
FIG. 1C is a cross-sectional view of part of a metasurface according to an embodiment.

A cross-sectional view of part of a metasurface according to an embodiment is shown in FIG. 1C. The substrate has a thickness of ~500 µm. The metal layer of Aluminium has a thickness of 70 nm with a $SiO_2$ cap layer. This diagram shows the cross-sectional view of the metasurface with the fused silica substrate. The light is incident through the substrate onto the metallic layer of aluminium which is covered by a cap layer of PECVD $SiO_2$.

To integrate the metasurface onto a sensor such as a camera chip, a UV resin glue could be used. The metasurface is designed to take this into account—as can be seen in the cross sectional schematic where there is a glue layer over the cap layer.

Figure 1D:
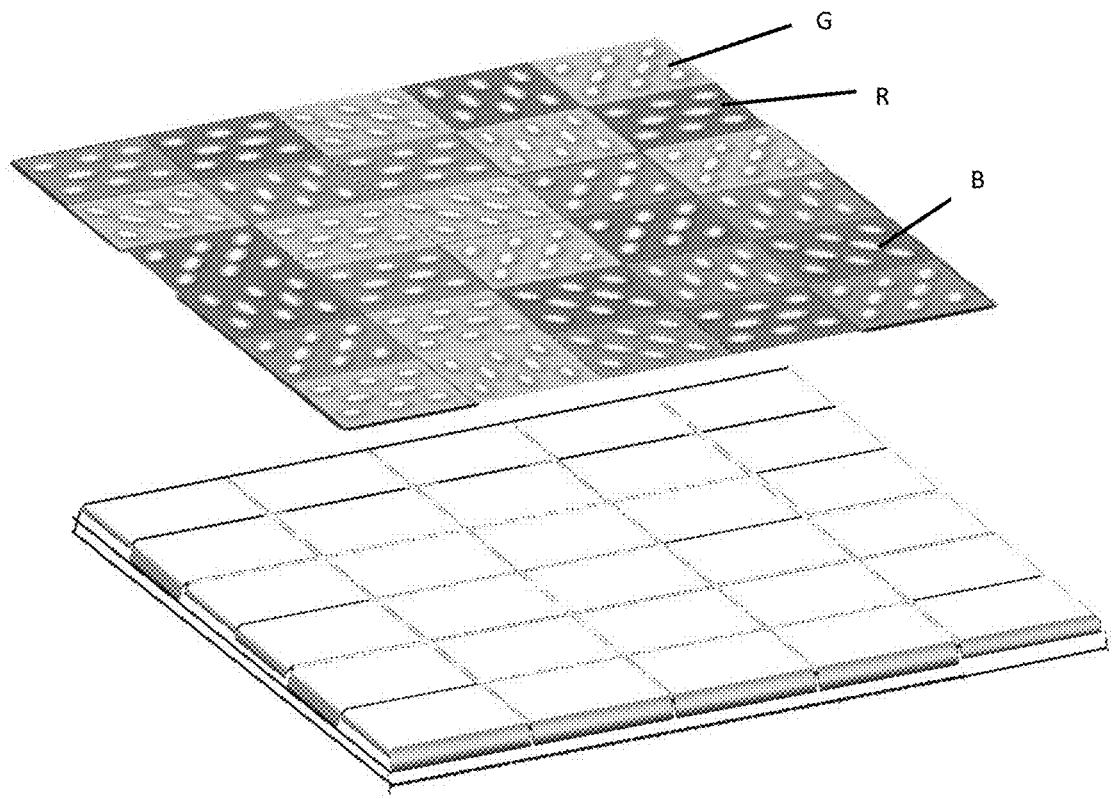
FIG. 1D is a schematic diagram illustrating integrating an embodiment with an imaging sensor.

FIG. 1D is a schematic diagram showing integration of a spectro-polarimeteric metasurface [005] onto an active sensing area of a camera chip [004] such that each pixel of the camera chip would be sensitive to a particular wavelength and polarization simultaneously. The metasurface can be manufactured in a large area format [005] and integrated directly onto a camera chip [004]. With this integration each pixel would see a particular wavelength and polarization of light giving it additional functionality rather than just intensity.

Figures 2, 3:
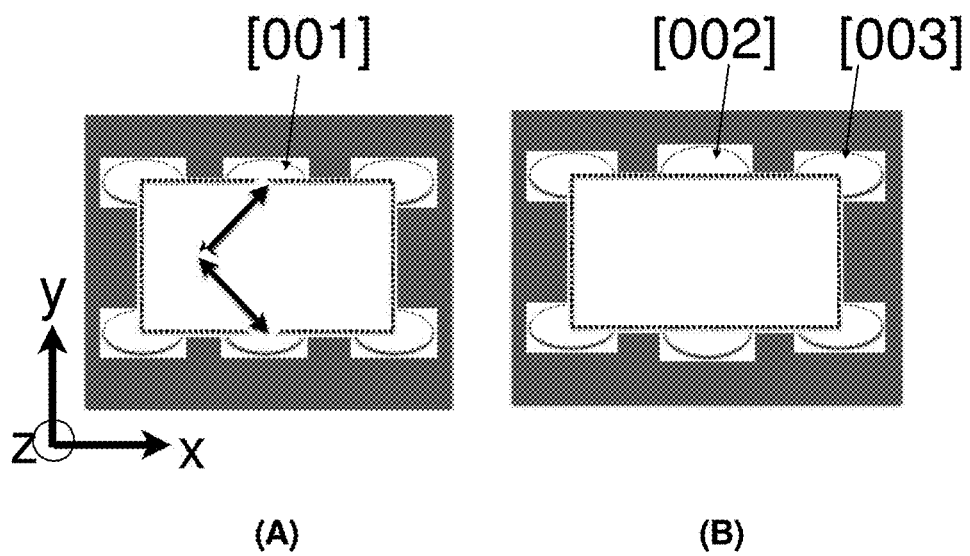
FIG. 2 is a schematic diagram of a unit cell suitable for use in the embodiment of FIG. 1.
FIG. 3 is a schematic diagram of another unit cell suitable for use in the embodiment of FIG. 1.
Figure 4:
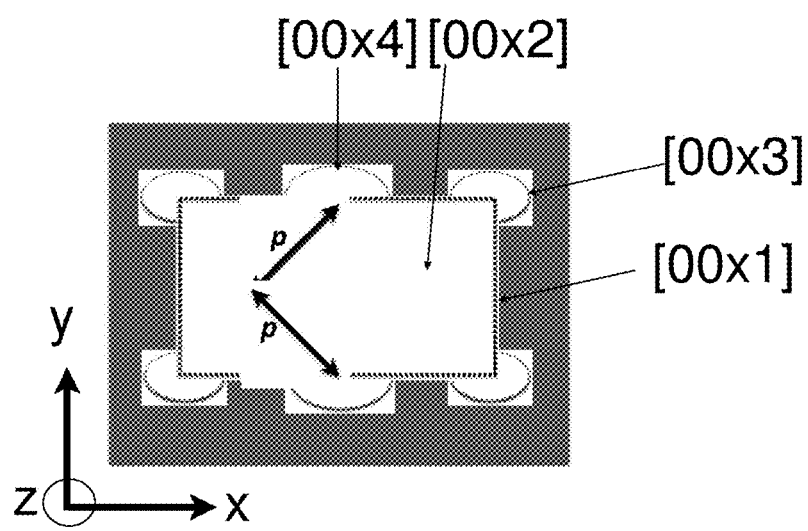
FIG. 4 is a schematic diagram of another unit cell suitable for use in the embodiment of FIG. 1; and, FIGS. 5-8 are simulated transmission curves of the embodiments.

FIGS. 2-4 are schematic plan views of a unit cell according to various embodiments. These particular unit cells have been tuned so as to filter:

green light (Metasurface filter-Green, MSF-G) and 90° polarization state (FIG. 2);
red light (Metasurface filter-Red, MSF-R) and 90° polarization state (FIG. 3);
blue light (Metasurface filter-Blue, MSF-B) for 90° polarization state (FIG. 4).

The size and spacing of the nanoholes dictate the frequency filtered while the orientation of the elliptical axes (which are the same for all nanoholes in the unit cell) dictates polarization filtering. There is a performance relationship between these two geometrical attributes of the unit cell and this is taken into account in preferred embodiments during tuning so as to achieve optimized performance for a desired frequency and polarization. This relationship is discussed in detail below.

In FIG. 2, (filtering green light (MSF-G) and 90° polarization state), the unit cell comprises elliptical nanoholes [001] of dimensions $\lambda/6$ and the $$\frac{b}{a}$$

ratio of 0.6.

In FIG. 3 (filtering red light (MSF-R) and 90° polarization state), the ellipses [003] have minor axes b of approximately $\lambda/6$ and the $$\frac{b}{a}$$

ratio of 0.65; whereas the ellipses [002] have minor axis b of approximately $\lambda/5.75$ and the $$\frac{b}{a}$$

ration of 0.6.

In FIG. 4 (filtering Blue light (MSF-B) and 90° polarization state), the dimensions of the elliptical nanoholes in [00x2] the ratio $$\frac{b}{a}$$

is 0.65 with b being approximately $\lambda/6$. The dimensions of the elliptical nanoholes in [00x4] the ratio $$\frac{b}{a}$$

is 0.725 and b is approximately $\lambda/5.5$. The dimensions of the elliptical nanoholes in [00x3] the ratio $$\frac{b}{a}$$

is 0.65 and b is approximately $\lambda/7$.

Figure 5:
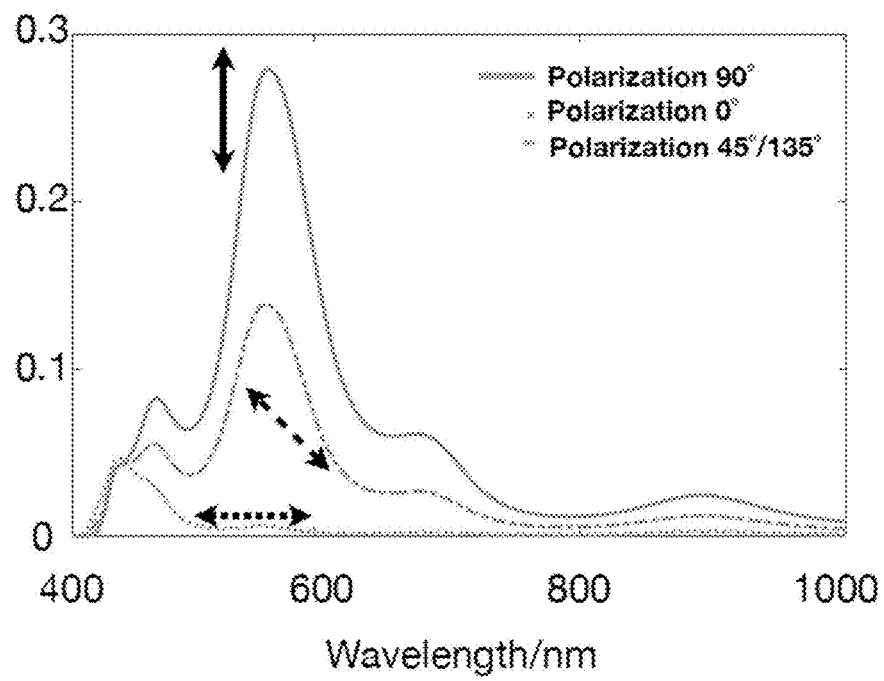

FIG. 5 shows the simulated transmission curves for the embodiment of FIG. 2, with the peak transmission of 27.9% with a FWHM of 55 nm at $\lambda_{speak}$ 550 nm. Similar to MSF-B, the PER is efficient at $-17.5$ dB (170:1).

Figure 6:
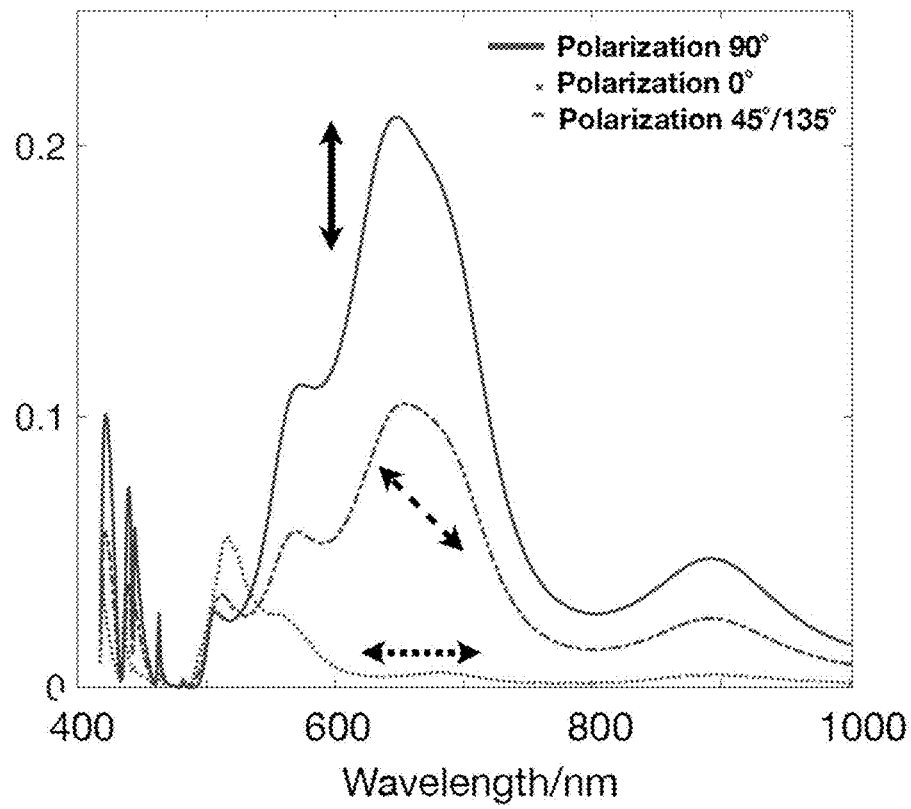

The simulated transmission curves for the embodiment of FIG. 3 are shown in FIG. 6. The transmission of this filter is 20.6% with a FWHM of 90 nm and $\lambda_{peak}$ at 648 nm. The transmission of red is lower than blue and green due to the reduced effect of QCWs.

Unlike prior known metasurface designs, the arrangement of the nanoholes and their geometry in preferred embodiments enhances transmission of light through the generation of plasmons, and, advantageously, quasi-cylindrical waves (QCW) as well. In contrast to known plasmonic metasurfaces, metasurfaces according to preferred embodiments generate QCWs, which explains the increase in transmission when compared to completely plasmonic metallic films. As a consequence, preferred embodiments show a higher transmission for a particular wavelength and polarization. Conjointly, this device structure is compatible with all CMOS manufacturing technologies known to the inventors that is used for making chips for imagers.

When light couples to the nanoholes, the evanescent fields are confined to the interfaces of the metal/substrate and metal/cap. In turn, these interact with the guided modes in the nanoholes which results in the production of localized surface plasmon resonances (LSPR). Strong electric fields at both interfaces together with QCWs launched from the nanoholes and surface plasmon polaritons (SPP) contribute to the high transmission that is observed form these devices at $\lambda_{peak}$. This differs from standard metasurface designs in which only the resonant coupling between the incident light and SPPs contribute to the extraordinary optical transmission (EOT). QCWs are evanescent waves in the form of a Bessel function that arise from the coupling of the incident light with the guided mode confined in the nanoholes, from which they decay exponentially. The total field scattered by the nanoholes at the interface is not a pure SPP mode, but incorporates a QCW traveling along the interface with the amplitude decaying with increasing distance away from the nanohole, namely x. The decay of the QCW is much faster than that of the SPP for $x>\lambda$. On the other hand, for $x<\lambda$, the two waves almost equally contribute to the total field. The interaction of the QCW and SPP with LSPR at the interfaces between metal layer and substrate, as well as between metal and glass cap layer, makes the scattering field dependent on the shape of the nanohole.

Eqs. (1) and (2) represent the y component of the H-field and z component of the E-field respectively taking into account the elliptical nanoholes are placed around the origin (z=0), $$H_x^{\pm}(y, z=0) = \begin{cases} \beta_{Spp}H_0|y|^{-\frac{1}{2}}e^{(\mp ik_{Spp}y)} + \beta_{QCW}H_0\left(\frac{|y|^{-m}}{\lambda_0}\right)e^{\mp(ik_0y-\alpha)}, & y<0 \\ \beta_{Spp}H_0|y|^{-\frac{1}{2}}e^{(\mp ik_{Spp}y)} + \beta_{QCW}H_0\left(\frac{|y|^{-m}}{\lambda_0}\right)e^{\mp(ik_0y+\alpha)}, & y>0 \end{cases} \quad (1)$$

$$E_z^{\pm}(x, z=0) = \begin{cases} \beta_{Spp}H_0|x|^{-\frac{1}{2}}e^{(\mp ik_{Spp}x)} + \beta_{QCW}E_0\left(\frac{|x|^{-m}}{\lambda_0}\right)e^{\mp(ik_0x-\alpha)}, & x<0 \\ \beta_{Spp}H_0|x|^{-\frac{1}{2}}e^{(\mp ik_{Spp}x)} + \beta_{QCW}E_0\left(\frac{|x|^{-m}}{\lambda_0}\right)e^{\mp(ik_0x+\alpha)}, & x>0 \end{cases} \quad (2)$$

where the $\beta$ term denotes the contribution of the SPP and the QCW to the total H-field/E-field. The fitting parameter, m, denotes the decay of the QCW from the nanohole. The change in phase due to the QCW is denoted by $\alpha$. Thus, the design consisting of elliptical nanoholes of varying geometries that demonstrates that a combination of quasi-cylindrical waves (QCW) and localized surface plasmon resonance (LSPR) should be considered as the origin of the EOT on top of the surface plasmon polaritons (SPPs) contributions. In so doing, the results we present here exemplify the pattern geometry-dependence as well as period-dependence on EOT, enabling the demonstration of higher transmission color and polarization selectivity.

The design principles of the unit cell of the metasurface according to a preferred embodiment are:

1) wavelength selectivity with high transmission along with polarization sensitivity with an efficient extinction ratio;

2) suppression of higher order modes such that a sensor pixel underlying a respective unit cell detects its designated color and polarization without transmission signatures for other colors and polarization in the visible spectrum.

In one embodiment, these principles are addressed by use of geometrical design variants of a unit cell. A unit cell is the building block of the metasurface device and this is repeated throughout the area of concern in such a way to obtain the functionalities of that particular design and align unit cells to pixels when the filter is in place over the sensor (the mapping of unit cells to pixels may be 1:1 or many:1). The geometry and period p of the unit cell may be modified to scale to any wavelength in the visible and SWIR spectrum (450 nm-2 µm).

The resonant coupling between the evanescent fields and the incident light occurs along the minor axis of the ellipse (b). Thus, the orientation of the ellipses (shown as $\phi$ in FIG. 1B) makes this design sensitive to the polarization of incident light and along with the arrangement of other elliptical nanoholes that form the unit cell [001], together provide the wavelength selectivity. The period, p, determines the position of $\lambda_{spp}$ which is the dip in transmission before EOT. This is given by Eq 3:

$$\lambda_{SPP} = \frac{p}{\sqrt{\frac{4}{3}(i^2+ij+j^2)}}\sqrt{\frac{\varepsilon_m\varepsilon_d}{\varepsilon_m+\varepsilon_d}} \quad (3)$$

Where i and j are the diffraction orders which in this case is—(1,0). The permittivities of the dielectric and metal layers are given as $\varepsilon_d$ and $\varepsilon_m$, respectively.

Thus, changing the period, p, would change $\lambda_{spp}$ that changes the $\lambda_{peak}$ at which the EOT occurs. Thus, p can be scaled to make the metasurface selective for any desired wavelength in the visible spectrum. To achieve a higher transmission and better wavelength selectivity while maintaining the same polarization extinction ratio, the dimensions of the elliptical nanoholes are modified as well.

Figure 7:
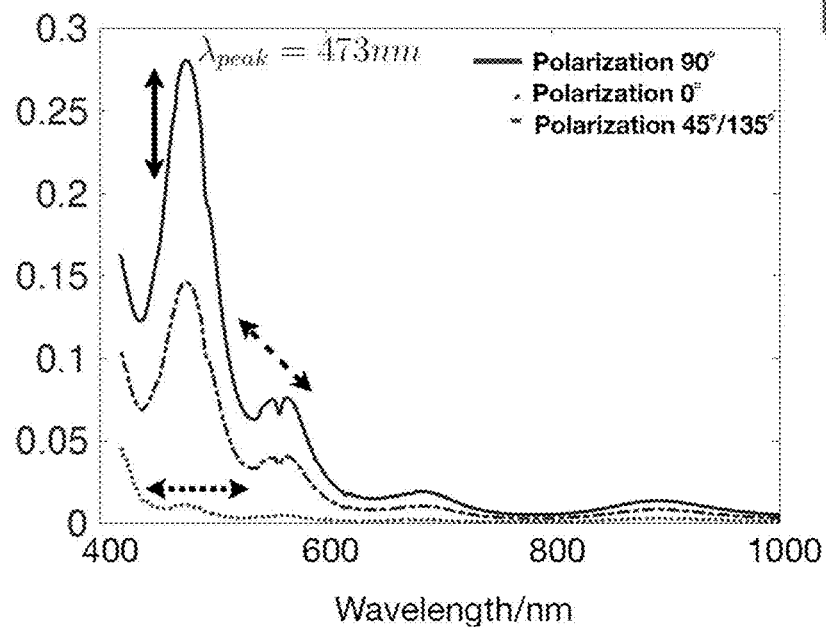
Figure 7:
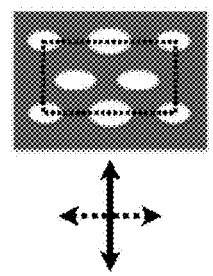

FIG. 7 shows the simulated transmission curves of the embodiment of FIG. 4. The unit cell depicted by [00x1] comprises of elliptical nanoholes of varying dimensions. The period p was calculated as per Equation 3. As indicated above, the dimensions of the elliptical nanoholes in [00x2] the ratio $$\frac{b}{a}$$

is 0.65 with b being approximately $\lambda/6$. The dimensions of the elliptical nanoholes in [00x4] the ratio $$\frac{b}{a}$$

is 0.725 and b is approximately $\lambda/5.5$. The dimensions of the elliptical nanoholes in [00x3] the ratio $$\frac{b}{a}$$

is 0.65 and b is approximately $\lambda/7$. In the figure, $\lambda_{spp}$ is the dip before the EOT that occurs at $\lambda_{speak}$ at 473 nm with a full-width-half-maximum (FWHM) of 60 nm. The orthogonal polarization (0°) is flat through the visible regime. A transmission efficiency of 28% was observed.

The polarization extinction ratio (PER), calculated as $$10\log_{10}\frac{E_{blue}^{0°}}{E_{blue}^{90°}},$$

of −14 dB is obtained. The PER is the quantitative measure of the certainty of observing a polarization state. The out-of-band rejection over the entire visible spectrum is high. Rotation of the elliptical nanoholes ($\phi$) would exhibit polarization selectivity for any desired polarisation state.

Figure 8:
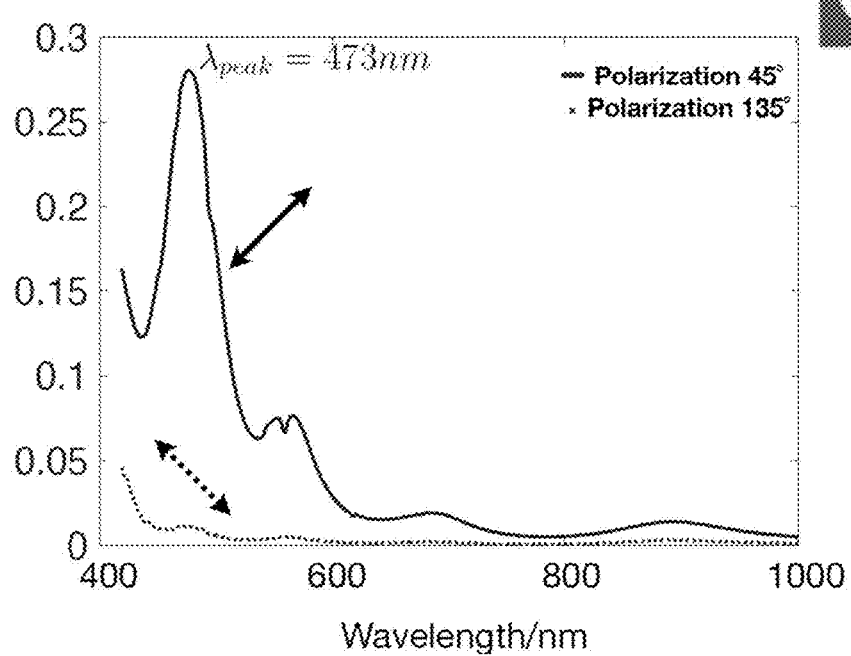
Figure 8:
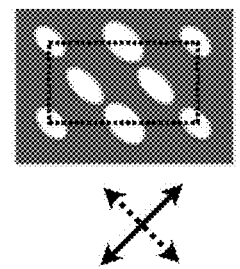

An example of this is shown in FIG. 8 wherein $\phi$ is rotated to 135°, where the horizontal x axis is 0°, and thus this unit cell design is selective to 45° polarization state while filtering blue light.

For optimal performance, the spectral overlap between the colors for a particular polarization is of importance. It is advantageous for imaging that a particular pixel detects with high certainty the color and polarization state of the designed metasurface integrated onto it, thus the spectral overlap (or cross talk) between various filters should be as low as possible. The PER between the three colors of orthogonal polarization states is tabulated in Table 1. The table reads as the PER between the colors and polarization state (in the subscript) given in terms of dB.

Preferably, the difference between two colors should be as high as possible and well above 50%. This is because the transmission intensity for the orthogonal pair of 45° and 135° will be 50% the value of 90° (as shown in FIG. 7) for the same filtered color of light. In other words, the PER of any polarization state and color needs to be much larger than −3 dB. Such that there is no discrepancy in detecting one particular color and polarization state.

| Polarisation and color | PER(dB) |
|---|---|
| $Blue_{0°}$-$Blue_{90°}$ | −14 |
| $Green_{90°}$-$Blue_{90°}$ | −5.05 |
| $Red_{90°}$-$Blue_{90°}$ | −26 |
| $Green_{0°}$-$Green_{90°}$ | −17.5 |
| $Blue_{90°}$-$Green_{90°}$ | −6.1 |
| $Red_{90°}$-$Green_{90°}$ | −5.3 |
| $Red_{0°}$-$Red_{90°}$ | −17.1 |
| $Blue_{90°}$-$Red_{90°}$ | −11.5 |
| $Green_{90°}$-$Red_{90°}$ | −6.1 |

The above embodiments have focused on visible light wavelengths and filtering. However, embodiments can also provide the same dual functionality (frequency and polarization filtering) for other wavelengths such as the SWIR regime. In such embodiments, the same design principles are used with the dimensions of the nanoholes scaled relative to the wavelength. However, annealed gold is substituted for aluminium and the nanoholes are formed in a nm thickness annealed gold layer.

Changing the period shifts the color selectivity to any desired wavelength in the visible spectrum, near infra-red (NIR) and short wave infra-red (SWIR). Scaling dimensions provides a higher transmission and polarization sensitivity.

The invention claimed is:

1. A plasmonic metasurface color light filter comprising a planar array of red, green and blue unit cells defining a pixelated color filter, each unit cell including a plurality of light-transmissive nanoholes having a non-circular substantially elliptical cross-section, each unit cell being individually tunable with respect to a red, green or blue frequency and a polarization of light to filter by varying geometry of its respective nanoholes whereby each pixel of the filter corresponds to a unit cell and is individually tunable, each pixel simultaneously filtering a selected red, green or blue light wavelength and a polarization to form the pixelated color filter.

2. The plasmonic metasurface color light filter of claim 1, wherein the tuning of the unit cell is optimized with regard to extinction ratio.

3. The plasmonic metasurface color light filter of claim 1, wherein each nanohole in a unit cell has its elliptical major and minor axes oriented in parallel to the respective elliptical major and minor axes of the other nanoholes in the unit cell, the orientation of the major and minor axes of the unit cell being selected in dependence on the polarization of light to be filtered by the respective unit cell.

4. The plasmonic metasurface color light filter of claim 1, wherein a size of nanoholes of the unit cells is selected in dependence on the light wavelength to be filtered by the respective unit cell.

5. The plasmonic metasurface color light filter of claim 1, wherein the array corresponds in size to an imaging sensor, each of the unit cells being positioned to align with a pixel of the imaging sensor when the array is placed over the imaging sensor.

6. The plasmonic metasurface color light filter of preceding claim 1, wherein the metasurface further comprises an aluminum layer having the nanoholes etched therein.

7. The plasmonic metasurface color light filter of claim 6, wherein the metasurface is capped.

8. The plasmonic metasurface color light filter of claim 1, wherein the metasurface further comprises an annealed gold film having the nanoholes etched therein.

9. A plasmonic metasurface color light filter comprising a planar array of red, green and blue unit cells defining a pixelated color filter, each unit cell including a plurality of light-transmissive nanoholes having a substantially elliptical cross-section, each unit cell being individually tunable with respect to a red, green or blue frequency and a polarization of light to filter by varying a geometry of its respective nanoholes,
wherein the geometry of the nanoholes in a unit cell is selected in dependence on the light wavelength to be filtered by the respective unit cell,
wherein each nanohole in the unit cell has its elliptical major and minor axes oriented in parallel to the respective elliptical major and minor axes of the other nanoholes in the unit cell, the orientation of the major and minor axes of the unit cell being selected in dependence on the polarization of light to be filtered by the unit cell whereby each pixel of the filter simultaneously filters a selected red, green or blue light wavelength and a polarization prior to the light reaching the array of pixels of the imaging sensor.

10. The plasmonic metasurface color light filter of claim 9, wherein the metasurface further comprises an aluminum layer having the nanoholes etched therein.

11. The plasmonic metasurface color light filter of claim 9, wherein the metasurface further comprises an annealed gold film having the nanoholes etched therein.

12. The plasmonic metasurface color light filter of claim 9, wherein the metasurface is capped.

13. An imaging sensor comprising:
an array of pixels;
a plasmonic metasurface color light filter positioned between the array of pixels and an imaging target, wherein the plasmonic metasurface comprises a planar array of red, green and blue unit cells defining a pixelated color filter, each unit cell of the color filter corresponding in size and position to a pixel of the imaging sensor, the planar array of unit cells being places over the imaging sensor whereby each of the unit cells aligns with a pixel of the imaging sensor,
wherein each unit cell includes a plurality of light-transmissive nanoholes having a non-circular substantially elliptical cross-section, each unit cell being individually tunable with respect to a red, green or blue frequency and a polarization of light to filter by varying a geometry of its respective nanoholes,
wherein the geometry of the nanoholes in a unit cell is selected in dependence on the light wavelength to be filtered by the respective unit cell,
wherein each nanohole in the unit cell has its elliptical major and minor axes oriented in parallel to the respective elliptical major and minor axes of the other nanoholes in the unit cell, the orientation of the major and minor axes of the unit cell being selected in dependence on the polarization of light to be filtered by the unit cell whereby each pixel of the filter simultaneously filters a selected red, green or blue light wavelength and a polarization prior to the light reaching the array of pixels of the imaging sensor.

14. The imaging sensor of claim 13, wherein the unit cells are tuned in accordance with a predetermined pattern across the array of unit cells, whereby filtering of one or more of light wavelength and light polarization is varied according to the predetermined pattern.

15. The imaging sensor of claim 13, wherein the imaging sensor comprises a single photon avalanche diode, spad, imaging sensor.

16. The imaging sensor of claim 13, wherein the imaging sensor comprises a CMOS imaging sensor.

17. The imaging sensor of claim 13, wherein the metasurface further comprises an aluminum layer having the nanoholes etched therein.

18. The imaging sensor of claim 13, wherein the metasurface further comprises an annealed gold film having the nanoholes etched therein.

19. The imaging sensor of claim 13, wherein the metasurface is capped.

* * * * *